June 9, 1964 J. E. ADAMS 3,136,206
SHIM-WASHER
Filed March 23, 1962

INVENTOR.
JAMES E. ADAMS
BY
Malcolm W. Fraser
ATTORNEY

United States Patent Office 3,136,206
Patented June 9, 1964

3,136,206
SHIM-WASHER
James E. Adams, Curtice, Ohio, assignor to The Bishop and Babcock Corporation, Cleveland, Ohio, a corporation of Ohio
Filed Mar. 23, 1962, Ser. No. 181,869
2 Claims. (Cl. 85—50)

This invention relates to washers in the form of perforated metal discs of relatively rigid form ordinarily used beneath the head of a bolt or nut, for example, for the purpose of allowing the load to be properly distributed over the associated parts.

An object is to produce a new and improved washer which is capable of withstanding exceedingly heavy loads without distortion or deformation and has the added advantage of being able to superpose upon similar washers without the several washers nesting, thereby to enable the washers to have utility as shims.

Another object is to produce a method of making the shim-washer structure.

Other objects and advantages of the invention will hereinafter appear, and for purposes of illustration but not of limitation, an embodiment of the invention is shown in the accompanying drawings in which FIGURE 1 is a face or plan view of the shim-washer;

Figure 1:
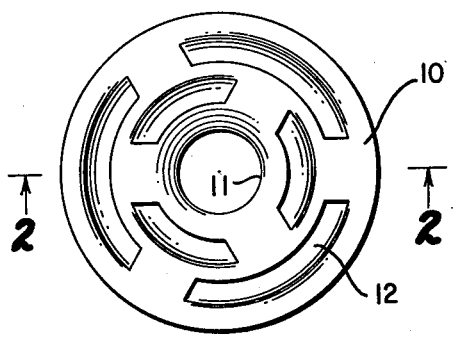

The illustrated embodiment of the invention comprises a shim-washer formed from a suitable gauge sheet metal and consisting of a disc 10 provided with a flanged central hole 11. Between the hole 11 and the outer edge portion of the disc are sector-shaped indentures or embossments 12, an outer and an inner row being shown. The indentures of the outer row are considerably longer than those of the inner row and those in the inner row are disposed in the spaces between the indentures of the outer row, thus providing a staggered arrangement of embossures or pads in order to distribute the load imposed on the washer more uniformly throughout the body thereof.

An important feature of the invention resides in the construction of the indentures 12. As particularly shown in FIGURE 2 the inner or free edge of each indenture is spaced from the opening in the disc from which it was pressed and thus overlaps the edge of such opening. As will hereinafter be more fully explained, the inner edge of each of the indentures as well as the side edges thereof are fractured or severed from the body of the disc 10 and then the free edge 13 is moved radially to overlap the adjacent edge of the opening from which the indenture was fractured.

Figure 2:
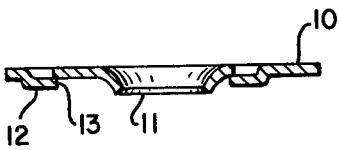
FIGURE 2 is a cross sectional view substantially on the line 2—2 of FIGURE 1.

The overlapping edge portion 13 of each of the sector-shaped indentures greatly increases the yield strength of the washer. For example an ordinary embossing can successfully sustain a load of the order of 1000 pounds per square inch before starting to flatten. On the other hand by having the edge portions of the indentures overlap as shown in FIGURE 2, the yield strength of the shim-washer is increased to in excess of 17,000 pounds per square inch before distortion. Another advantage of the structure is that it enables several of the shim-washers to be superposed one on the other to effect the spacing of associated parts. This can be achieved without the parts nesting as would be the case in the event of the ordinary embossures, so that the structure not only serves the function of a washer but several washers serve as shims to space one part from another. Such spacing greatly exceeds the mean thickness of the shim-washer.

Figure 4:
FIGURES 4, 5 and 6 are fragmentary sectional views showing the successive steps employed in forming the indentures or embossments on the shim-washer.
Figure 3:
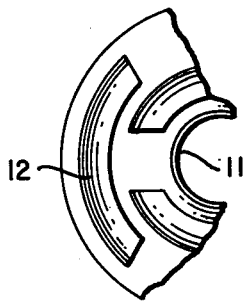
FIGURE 3 is a fragmentary view of the shim-washer viewed from the opposite side of that shown on FIGURE 1.
Figure 5:
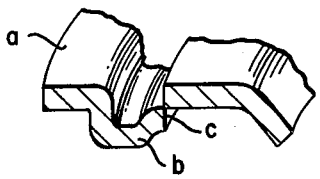
Figure 6:
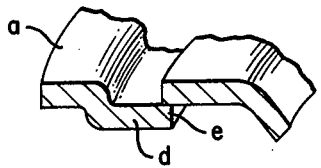

FIGURES 4 to 6 illustrate the method of forming the indentures. FIGURE 4 shows a fragment of an apertured disc a. FIGURE 5 illustrates the step in which the sectors are pressed from the disc b, indicating the manner in which the sectors are pressed from the body of the disc and c indicates the part which is fractured from the body of the disc and moved to a position below the opposite side of the disc. Thereafter, as indicated in FIGURE 6, by the use of a suitable die the indenture d is pressed radially so that the edge portion e overlaps the adjacent portion of the disc body.

From the above description it will be apparent that I have produced an exceedingly simple washer structure which has an outstanding yield strength, greatly exceeding that of the particular gauge sheet metal employed. Thus a relatively light gauge sheet metal may be used and performs satisfactorily without flattening under very heavy load conditions. A notable advantage of the construction is that several of these washers may be superposed for shim or spacing purposes without liability of one nesting with another. This could not occur if simple embossures were formed since one embossure would readily fit into another.

Numerous changes in details of construction, arrangement, and operation may be effected without departing from the spirit of the invention especially as defined in the appended claims.

What I claim is:

1. An apertured washer having opposite sides and comprised of sheet material, said sheet material having a substantially uniform thickness, spaced indentures being formed in one surface of the sheet material of said washer and projecting from the opposite surface thereof, said indentures being spaced from one another about the aperture in said washer to provide a uniform load support across the surface of said washer, each indenture consisting of a tongue-like member having severed side and free edge portions, the free end portion of each of said members having an upper surface in at least partially overlapping relation in a radial direction and abutting the adjacent portion of said washer and a lower surface in parallel and spaced relation to said one surface of the sheet material of said washer, said lower surface thereby forming a contact pad surface to increasse the yield strength and militate against nesting of similar washers.

2. The structure defined in claim 1 wherein said indentures are arcuately shaped and arranged in staggered relation.

References Cited in the file of this patent
UNITED STATES PATENTS

| | | |
|---|---|---|
| 1,143,091 | Stimpson | June 15, 1915 |
| 1,670,890 | Illmer | May 22, 1928 |
| 1,963,028 | Olson | June 12, 1934 |
| 2,191,101 | Stellin | Feb. 20, 1940 |